US005715730A

United States Patent [19]
Riefe et al.

[11] Patent Number: 5,715,730
[45] Date of Patent: Feb. 10, 1998

[54] TILT ADJUSTABLE MOTOR VEHICLE STEERING COLUMN

[75] Inventors: Richard Kremer Riefe, Saginaw; Howard David Beauch, Frankenmuth; Roger Allen Bourbina, Saginaw, all of Mich.

[73] Assignee: General Motors Corporation, Detroit, Mich.

[21] Appl. No.: 662,757

[22] Filed: Jun. 10, 1996

[51] Int. Cl.$^6$ ........................................... B62D 1/18
[52] U.S. Cl. ........................................... 74/493; 74/495
[58] Field of Search ........................... 74/493, 495, 492, 74/491; 280/777, 775

[56] References Cited

U.S. PATENT DOCUMENTS

| | | | |
|---|---|---|---|
| 3,199,625 | 8/1965 | Liebreich | 74/493 |
| 3,245,282 | 4/1966 | Kimberlin | 74/493 |
| 3,267,766 | 8/1966 | Glover et al. | 74/493 |
| 3,392,599 | 7/1968 | White | 74/492 |
| 3,473,405 | 10/1969 | Deford et al. | 74/493 |
| 4,470,322 | 9/1984 | Beauch | 74/493 |
| 4,543,848 | 10/1985 | Beauch | 74/493 |
| 4,664,221 | 5/1987 | Loney et al. | 74/493 |
| 4,850,239 | 7/1989 | Oosterwal | 74/493 |
| 4,970,910 | 11/1990 | Cymbal | 74/493 |
| 5,144,855 | 9/1992 | Yamaguchi et al. | 74/493 |
| 5,509,325 | 4/1996 | Thomas | 74/493 |

*Primary Examiner*—Charles A. Marmor
*Assistant Examiner*—David M. Fenstermacher
*Attorney, Agent, or Firm*—Saul Schwartz

[57] ABSTRACT

A tilt adjustable motor vehicle steering column having a mast jacket on a motor vehicle body structure, a tilt housing supported on the mast jacket for pivotal movement about a lateral centerline of the steering column, a steering wheel rotatably supported on the tilt housing, a tilt latch for immobilizing the tilt housing, and an inertia-actuated secondary restraint operative independent of the tilt latch to prevent upward pivotal movement of the tilt housing. The secondary restraint includes a spool rotatably supported on the mast jacket, a tether on the spool having an end attached to the tilt housing, and an inertia-actuated latch operative to block rotation of the spool in response to high negative acceleration of the motor vehicle. The inertia-actuated latch includes a plurality of radial abutments on the spool, a pawl engageable on the radial abutments, and a pendulum operative to pivot the pawl into engagement on the radial abutments.

5 Claims, 1 Drawing Sheet

TILT ADJUSTABLE MOTOR VEHICLE STEERING COLUMN

FIELD OF THE INVENTION

This invention relates to motor vehicle steering columns.

BACKGROUND OF THE INVENTION

U.S. Pat. No. 4,543,848, issued Oct. 1, 1985 and assigned to the assignee of this invention, describes a motor vehicle steering column including an energy absorbing mast jacket connected to a body of the motor vehicle, a tilt housing supported on the mast jacket for up and down pivotal movement about a lateral centerline of the mast jacket, and a steering wheel rotatably supported on the tilt housing. The vertical position of the steering wheel relative to an operator seated behind the steering wheel is adjusted by up and down pivotal movement of the tilt housing. Such steering columns are commonly identified as "tilt adjustable". A tilt latch on the tilt adjustable steering column includes a rigid pin on the mast jacket and a notched shoe pivotally supported on the tilt housing which seats on the pin to immobilize the tilt housing relative to the mast jacket. In order to maintain the tilt housing immobilized relative to the mast jacket during an energy-absorbing collapse stroke of the steering column, the pin, the shoe, and corresponding supporting structure are constructed to withstand forces which substantially exceed forces encountered in everyday operation of the steering column.

SUMMARY OF THE INVENTION

This invention is a new and improved tilt adjustable motor vehicle steering column having a mast jacket connected to a motor vehicle body structure, a tilt housing supported on the mast jacket for pivotal movement about a lateral centerline of the mast jacket, a steering wheel rotatably supported on the tilt housing, a tilt latch for immobilizing the tilt housing relative to the mast jacket, and an inertia-actuated secondary restraint operative independent of the tilt latch to prevent upward pivotal movement of the tilt housing. The secondary restraint includes a spool rotatably supported on the mast jacket, a tether on the spool having an end attached to the tilt housing, and an inertia-actuated latch operative to block rotation of the spool in response to high negative acceleration of the motor vehicle. The inertia-actuated latch includes a plurality of radial abutments on the spool, a pawl engageable on the radial abutments to immobilize the spool, and a pendulum operative to pivot the pawl into engagement on the radial abutments in response to high negative acceleration of the motor vehicle.

DESCRIPTION OF A PREFERRED EMBODIMENT

Figure 1:
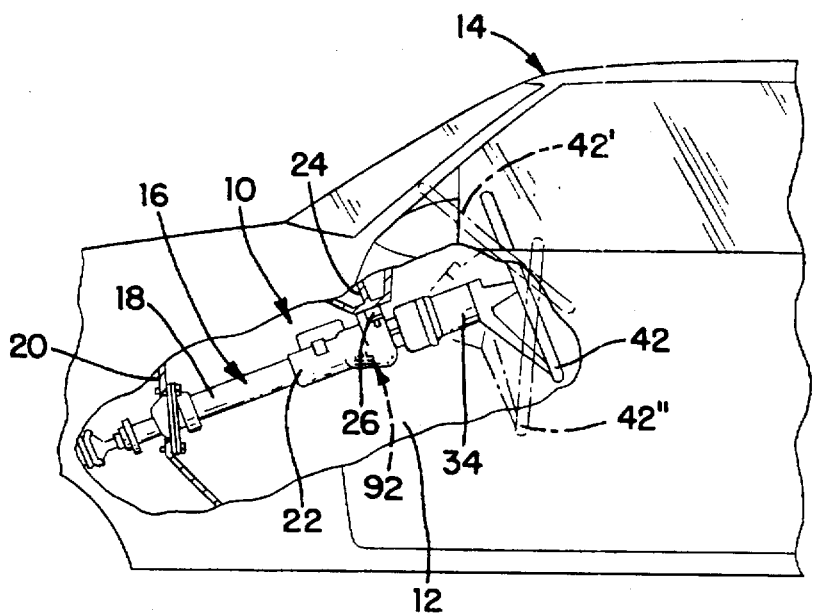
FIG. 1 is a fragmentary, partially broken-away side elevational view of a motor vehicle having mounted thereon a steering column according to this invention.

Referring to FIG. 1, a steering column 10 according to this invention in a passenger compartment 12 of a motor vehicle body 14 includes a mast jacket 16 consisting of a tubular lower element 18 seated against a vertical panel 20 of the vehicle body 14 defining the front of the passenger compartment 12 and a tubular upper element 22 connected to an instrument panel support 24 of the vehicle body through a releasable bracket 26. An energy absorber, not shown, such as described in U.S. Pat. No. 3,392,599, issued Jul. 16, 1968 and assigned to the assignee of this invention, is disposed in the annulus where the tubular upper and lower elements 22, 18 overlap.

A tilt housing 28 is supported on an upper end 30 of the tubular upper element 22 for pivotal movement about a lateral centerline 32 of the steering column and concealed behind a decorative bezel 34. An upper steering shaft 36 is supported on the tilt housing 28 by a pair of longitudinally separated bearings, only a single bearing 38 being visible in FIG. 2, for rotation about a longitudinal centerline 40 of the tilt housing. A steering wheel 42 is rigidly mounted on a distal end 44 of the upper steering shaft 36.

The upper steering shaft 36 is connected by a universal joint 46 to a lower steering shaft 48 supported on the tubular upper and lower elements 22, 18 of the mast jacket 16 for rotation about a longitudinal centerline 50 of the steering column. The vertical position of the steering wheel 42 is adjustable relative to an operator seated behind the steering wheel in a range between an upper position 42' and a lower position 42" by up and down pivotal movement of the tilt housing 28 about the lateral centerline 32. The longitudinal centerline 40 of the tilt housing 28 coincides with the longitudinal centerline 50 of the steering column generally in the middle of the range of adjusted positions of the tilt housing.

Figure 2:
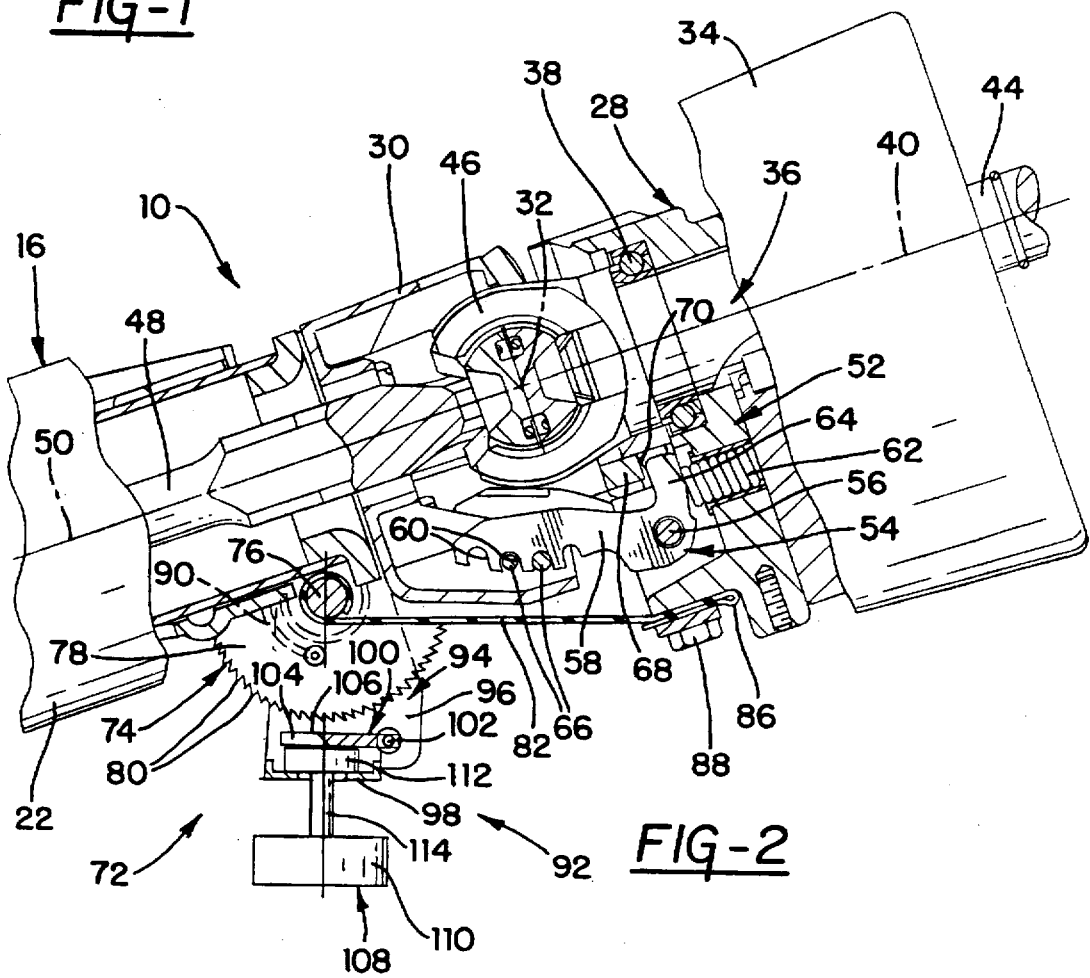
FIG. 2 is an enlarged, partially broken-away view of a portion of FIG. 1.

As seen best in FIG. 2, a fragmentarily illustrated tilt latch 52 includes a flat, generally L-shaped shoe 54 supported on a cylindrical journal 56 for pivotal movement in a plane perpendicular to the centerline of the cylindrical journal. A long side 58 of the shoe 54 has a plurality of notches 60 in an edge thereof. A spring 62 seats against the tilt housing 28 and against a short side 64 of the shoe perpendicular to the long side 58 to bias the shoe counterclockwise toward a latched position, FIG. 2, in which one or more of the notches 60 seat on one or both of a pair of rigid pins 66 on the tubular upper element 22. In its latched position, the shoe 54 immobilizes the tilt housing relative to the mast jacket 16 with respect to pivotal movement about the lateral centerline 32.

A release lever 68 of the tilt latch 52 is pivotable relative to the tilt housing 28 in a plane parallel to the longitudinal centerline 40 thereof about a centerline at an inboard end, not shown, of the lever. An outboard end of the lever, not shown, is accessible outside of the bezel 34. When an operator grasps the outboard end of the release lever 68 and pivots the lever toward the steering wheel 42, an edge 70 of the lever engages the short side 64 of the shoe 54 and pivots the shoe clockwise, FIG. 2, against the spring 62 to an unlatched position, not shown, in which the notches 60 are fully separated from the pins 66. In the unlatched position of the shoe, the tilt housing 28 is freely pivotable up and down about the lateral centerline 32 to adjust the vertical position of the steering wheel 42.

With continued reference to FIG. 2, a secondary restraint 72 on the steering column 10 for the tilt housing 28 includes a spool 74 consisting of a cylindrical core 76 and a pair of disc-shaped sides rigidly connected to the core 76 in planes perpendicular to its centerline, only a single disc-shaped side 78 of the spool 74 being visible in FIG. 2. The spool 74 is rotatably supported on the tubular upper element 22 of the steering column 10 with the cylindrical core 76 generally parallel to the lateral centerline 32. The peripheral edge of the disc-shaped side 78 of the spool 74 is interrupted by a plurality of radial saw-tooth abutments 80.

A flexible tether 82 of the secondary restraint 72 has an inboard end 84 rigidly attached to the cylindrical core 76 of the spool 74 and an outboard end 86 rigidly attached to the tilt housing 28 by a fastener 88. A schematically represented coil torsion spring 90 between the spool 74 and the tubular upper element 22 biases the spool in a clockwise, wind-up direction, FIG. 2. The tether 82 may be made of woven fabric or flexible metal or may have other constructions consistent with flexibility and tensile strength.

When the tilt housing 28 pivots up about the lateral centerline 32, tension is applied to the tether 82 and the latter rotates the spool in a counterclockwise, unwind direction, FIG. 2. When the tilt housing 28 pivots down about the lateral centerline 32, tension on the tether is relieved and the spring 90 rotates the spool in the wind-up direction to wind the tether on the cylindrical core 76. Accordingly, during manual adjustment of the vertical position of the steering wheel 42, the tether 82 idles back and forth between an extended position, not shown, fully unwound from the spool 74 at the upper position 42' of the steering wheel and a retracted position, not shown, fully wound on the spool at the lower position 42" of the steering wheel.

A schematically illustrated inertia-responsive latch 92 of the secondary restraint 72 operative to arrest the tether 82 includes a bracket 94 rigidly attached to the tubular upper element 22 having a vertical side 96 and a horizontal side 98. A flat pawl plate 100 is supported at a first edge 102 thereof on the vertical side 96 of the bracket 94 for pivotal movement about a centerline perpendicular to the vertical side. The pawl plate 100 traverses the plane of the disc-shaped side 78 of the spool 74 and has a slot 104 overlapping the plane of the disc-shaped side 78. The slot 104 terminates at a pawl edge 106 beveled to generally match the saw-tooth radial abutments 80 on the disc-shaped side 78 of the spool.

A pendulum 108 of the inertia-responsive latch 92 has a mass 110 at one end, a head 112 at the other end, and a spindle 114 between the mass and the head. The pendulum normally hangs vertically, FIG. 2, from the horizontal side 98 of the bracket 94 with the head 112 of the pendulum seated flush on the horizontal side 98 below the pawl plate 100 and with the spindle 114 protruding through a slot in the horizontal side. In that position of the pendulum, the pawl edge 106 is remote from the saw-tooth radial abutments 80 so that the spool 74 is permitted to rotate freely as the tether idles between its aforesaid extended and retracted positions.

In the event that the motor vehicle body 14 experiences a high negative acceleration characteristic of the onset of an energy-absorbing collapse stroke of the steering column 10, the inertia of the mass 110 oft he pendulum 108 swings the pendulum clockwise relative to the mast jacket 16, FIG. 2, about a fulcrum defined at an edge of the head 112 of the pendulum. Concurrently, at a point opposite the fulcrum, the head 112 of the pendulum engages the pawl plate 100 from underneath and pivots the pawl plate clockwise, FIG. 2, to engage the pawl edge 106 on one of the saw-tooth radial abutments 80 and thereby rotatably immobilize the spool 74. In that circumstance, the tether 82 is tensioned between the mast jacket 16 and the tilt housing 28 to positively foreclose upward pivotal movement of the tilt housing about the lateral centerline 32 regardless of whether the shoe 54 is in its latched or unlatched position.

An advantage attributable to the secondary restraint 72 is potential manufacturing cost saving achieved by reducing the robustness of the structural elements of the tilt latch 52. For example, because the tilt latch is required only to react between the tilt housing 28 and the mast jacket 16, forces encountered during manual adjustment and normal use of the steering wheel 42, the shoe 54, the pins 66, and corresponding support structure do not need the robustness previously required and may, therefore, be manufactured more economically.

What is claimed is:

1. A motor vehicle steering column including a mast jacket attached to a body structure of a motor vehicle, a tilt housing supported on said mast jacket for up and down pivotal movement about a lateral centerline of said steering column through a range of adjusted positions between an upper limit and a lower limit, a steering wheel rotatably supported on said tilt housing, a manual tilt latch means operative to rotatably immobilize said tilt housing relative to said mast jacket within said range of adjusted positions and to release said tilt housing for unobstructed pivotal movement of said tilt housing through said range of adjusted positions, and a secondary restraint means operative to immobilize said tilt housing relative to said mast jacket with respect to pivotal movement of said tilt housing toward said upper limit, characterized in that said secondary restraint means comprises:

a flexible tether having a first end attached to said tilt housing so that said tilt housing pulls said flexible tether from a retracted position to an extended position concurrent with pivotal movement of said tilt housing from said lower limit to said upper limit, and a latch means on said mast jacket operative to arrest said tether in response to negative acceleration of said motor vehicle body structure so that said tether is tensioned between said mast jacket and said tilt housing to positively restrain pivotal movement of said tilt housing toward said upper limit independently of said manual tilt latch means.

2. The motor vehicle steering column recited in claim 1 wherein said secondary restraint latch means comprises:

a spool rotatably supported on said mast jacket having a core and a disc-shaped side each rotatable as a unit with said spool, means attaching a second end of said flexible tether to said spool core, said flexible tether being wound on said core and operative to rotate said spool in an unwind direction concurrent with pivotal movement of said tilt housing toward said upper limit, and means engageable on said disc-shaped side of said spool operative in response to negative acceleration of said motor vehicle body structure to prevent rotation of said spool in said unwind direction.

3. The motor vehicle steering column recited in claim 2 wherein said secondary restraint latch means further comprises:

a spring between said mast jacket and said spool biasing said spool in a wind-up direction opposite said unwind direction so that said flexible tether is wound on said spool concurrent with pivotal movement of said tilt housing toward said lower limit.

4. The motor vehicle steering column recited in claim 3 wherein said means engageable on said disc-shaped side of said spool operative in response to negative acceleration of said motor vehicle body structure operative to prevent rotation of said spool in said unwind direction comprises:

a plurality of radial abutments on said disc-shaped side of said spool around the periphery of said disc-shaped side, a pawl supported on said mast jacket for pivotal movement between a first position remote from said radial abutments in which said spool is freely rotatable relative to said mast jacket and a second position engaging one of said radial abutments in which rotation of said spool in said unwind direction is positively prevented, and means operative in response to negative acceleration of said motor vehicle body structure to pivot said pawl from said first position to said second position.

5. The motor vehicle steering column recited in claim 4 wherein said means operative in response to negative acceleration of said motor vehicle body structure to pivot said pawl from said first position to said second position comprises:

a bracket on said mast jacket, and a pendulum having a head seated on said bracket in juxtaposition with said pawl in said first position of said pawl and a mass vertically below said head, said mass swinging said pendulum on said bracket in response to negative acceleration of said motor vehicle body structure and said head of said pendulum concurrently engaging said pawl and pivoting said pawl from said first position to said second position.

* * * * *